and(12) United States Patent
Kanishima et al.

(10) Patent No.: US 11,615,344 B2
(45) Date of Patent: Mar. 28, 2023

(54) CONDITION MONITORING DEVICE, METHOD, AND STORAGE MEDIUM

(71) Applicant: KABUSHIKI KAISHA TOSHIBA, Minato-ku (JP)

(72) Inventors: Yasuhiro Kanishima, Suginami (JP); Hiroyuki Yanagihashi, Kawasaki (JP); Takashi Sudo, Fuchu (JP); Kazunori Imoto, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 502 days.

(21) Appl. No.: 16/809,271

(22) Filed: Mar. 4, 2020

(65) Prior Publication Data
US 2021/0065918 A1    Mar. 4, 2021

(30) Foreign Application Priority Data
Aug. 28, 2019  (JP) .............................. JP2019-155768

(51) Int. Cl.
*G06N 20/00* (2019.01)
*G16Y 40/10* (2020.01)
*G16Y 20/20* (2020.01)
*G06K 9/00* (2022.01)

(52) U.S. Cl.
CPC ............ *G06N 20/00* (2019.01); *G06K 9/0055* (2013.01); *G06K 9/00523* (2013.01); *G16Y 20/20* (2020.01); *G16Y 40/10* (2020.01)

(58) Field of Classification Search
CPC ........ G16Y 40/10; G16Y 20/20; G16Y 40/00; G06N 20/00; G06K 9/00523; G06K 9/0055
See application file for complete search history.

(56) References Cited

U.S. PATENT DOCUMENTS

2019/0324433 A1*  10/2019  Celia ....................... H04L 67/12
2020/0143605 A1    5/2020  Kanishima et al.
2020/0198128 A1*  6/2020  Hatanaka ............. G05B 23/024
(Continued)

FOREIGN PATENT DOCUMENTS

JP       2010-250384 A     11/2010
JP       2012-117987 A      6/2012
(Continued)

OTHER PUBLICATIONS

@ shinmura0, "What is the difference between "weak anomaly detection" and other anomaly detection?", Dec. 10, 2019, (with English Translation), 35 pages.

*Primary Examiner* — Manav Seth
(74) *Attorney, Agent, or Firm* — Oblon, McClelland, Maier & Neustadt, L.L.P.

(57) ABSTRACT

According to one embodiment, a condition monitoring device includes a processor. The processor is configured to acquire a time-series signal about a condition of a monitor target from a first sensor, acquire operation timing information indicating start of operation of the monitor target, detect a first operation segment signal from the time-series signal based on the operation timing information, detect a second operation segment signal from the first operation segment signal based on a waveform feature of the first operation segment signal, and determine the condition of the monitor target based on the second operation segment signal.

12 Claims, 8 Drawing Sheets

(56) References Cited

U.S. PATENT DOCUMENTS

| | | | |
|---|---|---|---|
| 2020/0333777 A1* | 10/2020 | Maruyama | G06N 20/10 |
| 2021/0010909 A1 | 1/2021 | Yanagihashi et al. | |
| 2021/0065918 A1 | 3/2021 | Kanishima et al. | |
| 2021/0272704 A1* | 9/2021 | Sudo | G06K 9/6284 |

FOREIGN PATENT DOCUMENTS

| | | |
|---|---|---|
| JP | 2019-49778 A | 3/2019 |
| JP | 2020-77186 A | 5/2020 |
| JP | 2021-15405 A | 2/2021 |
| JP | 2021-33842 A | 3/2021 |

* cited by examiner

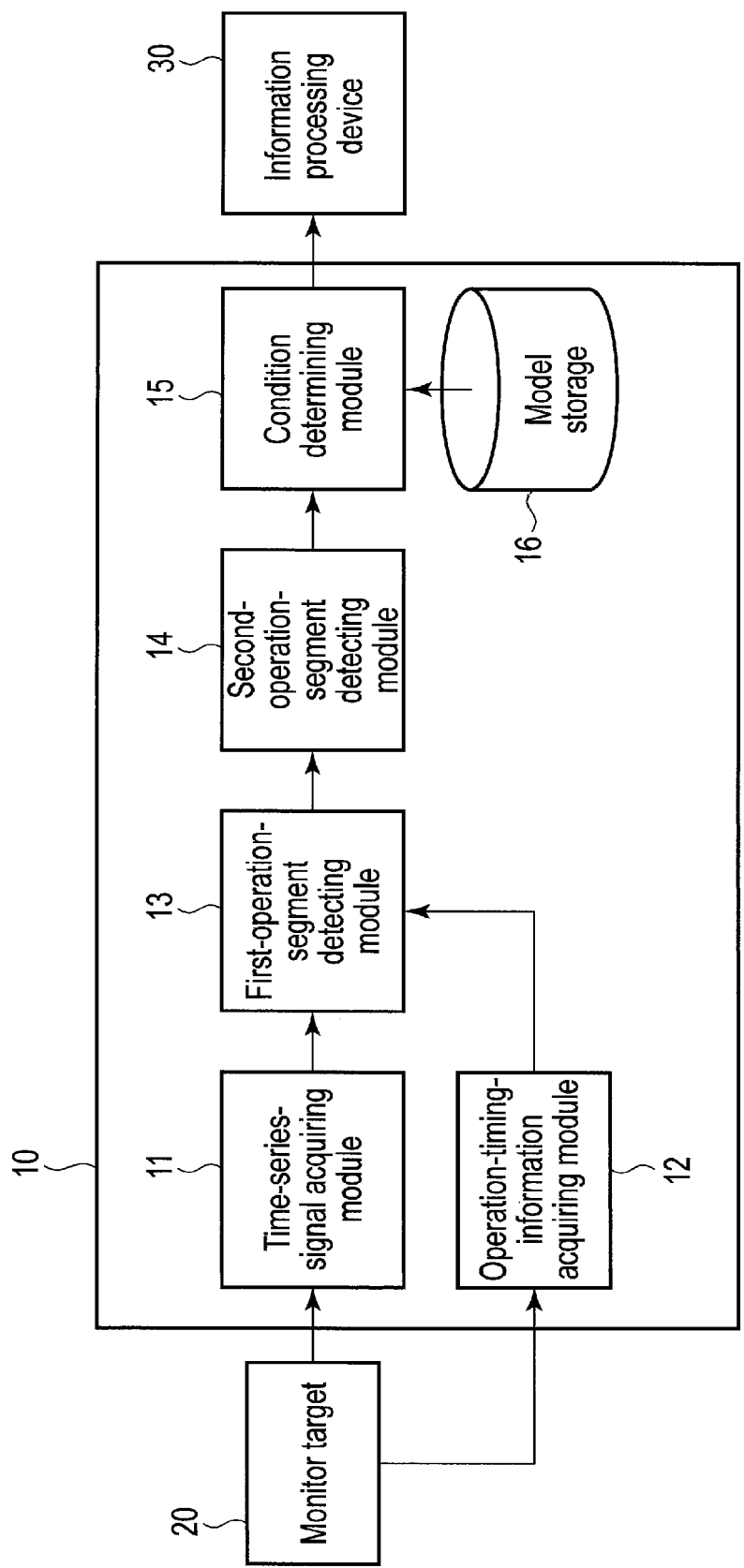
F I G. 1

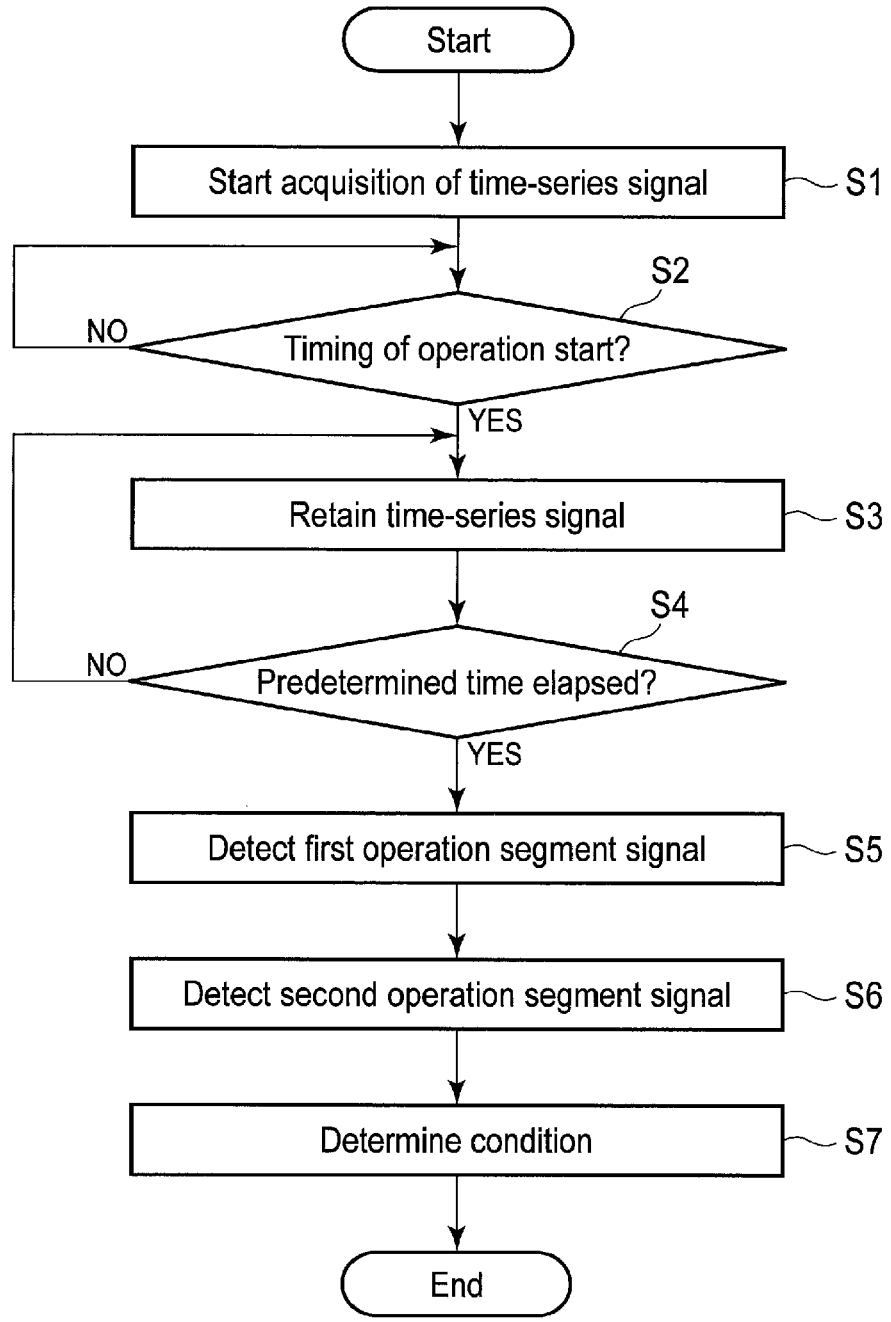
F I G. 3

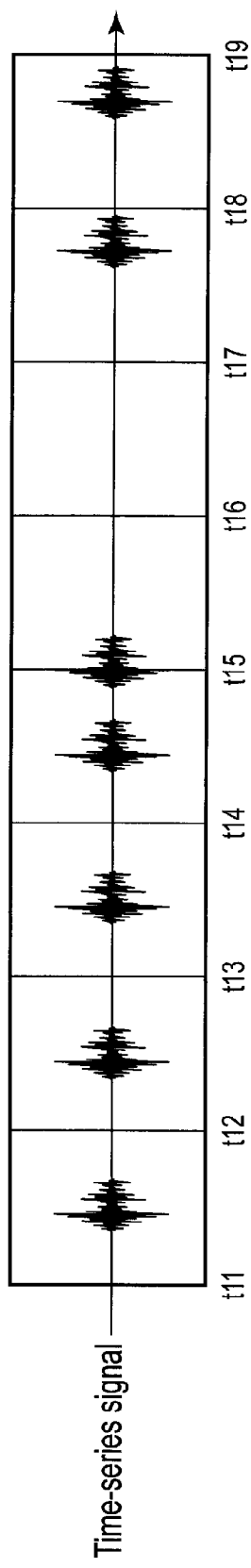
F I G. 5
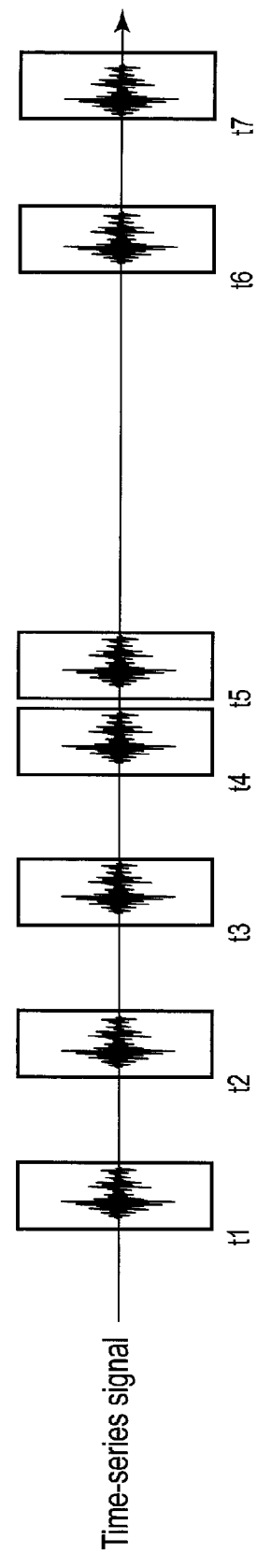
F I G. 6

CONDITION MONITORING DEVICE, METHOD, AND STORAGE MEDIUM

CROSS-REFERENCE TO RELATED APPLICATIONS

This application is based upon and claims the benefit of priority from Japanese Patent Application No. 2019-155768, filed Aug. 28, 2019, the entire contents of which are incorporated herein by reference.

FIELD

Embodiments described herein relate generally to a condition monitoring device, a method, and a storage medium.

BACKGROUND

Along with recent development of the Internet of Things (IoT), a condition monitoring device which monitors the condition of a monitor target based on signals (data) acquired by using various sensors has been developed.

Such a condition monitoring device is required to determine the condition of a monitor target in real time, and improvement in the real-time performance and improvement in the precision of the determination of the condition are demanded.

BRIEF DESCRIPTION OF THE DRAWINGS

FIG. 1 is a block diagram showing an example of a functional configuration of a condition monitoring device according to an embodiment.

FIG. 3 is a flow chart showing an example of a processing procedure to monitor the condition of a monitor target in the condition monitoring device.

FIG. 5 is a diagram for explaining operation of a comparative example of the present embodiment.

FIG. 6 is a diagram for explaining operation of the condition monitoring device according to the present embodiment in comparison with the operation of the comparative example.

DETAILED DESCRIPTION

Figure 2:
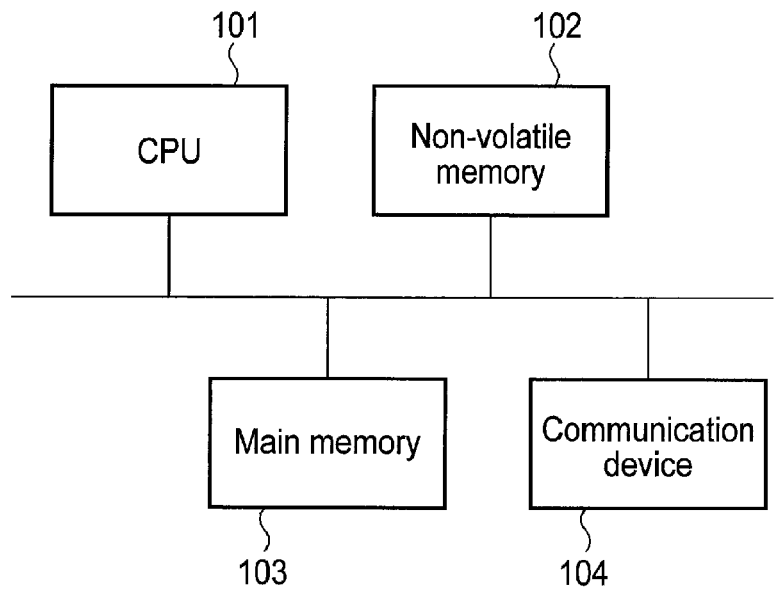
FIG. 2 is a diagram showing an example of a hardware configuration of a condition monitoring device.

In general, according to one embodiment, a condition monitoring device includes a processor. The processor is configured to acquire a time-series signal about a condition of a monitor target from a first sensor, acquire operation timing information indicating start of operation of the monitor target, detect a first operation segment signal from the time-series signal based on the operation timing information, detect a second operation segment signal from the first operation segment signal based on a waveform feature of the first operation segment signal, and determine the condition of the monitor target based on the second operation segment signal.

Various embodiments will be described hereinafter with reference to the accompanying drawings.

FIG. 1 is a block diagram showing an example of a functional configuration of a condition monitoring device according to the present embodiment. As shown in FIG. 1, the condition monitoring device 10 is communicably connected to each of a monitor target 20 and an information processing device 30. The condition monitoring device 10 is not required to be directly connected to, for example, the monitor target 20, and the condition monitoring device 10 may be configured to be able to acquire signals from later-described sensors attached to the monitor target 20.

Herein, examples of the monitor target 20 include devices provided at manufacturing factories, plants, construction sites, educational facilities, medical facilities, housing equipment, etc. The present embodiment will be mainly described on an assumption that the monitor target 20 is, for example, a device (press machine) which presses products with a die on a production line of a manufacturing factory.

The condition monitoring device 10 determines the condition of the monitor target 20, for example, based on the signals acquired by using the sensors attached to the monitor target 20. The determination result made by the condition monitoring device 10 is output to the information processing device 30.

The information processing device 30 is, for example, an electronic device provided with a display which can output the determination result made by the condition monitoring device 10 as an image, a speaker which can output it as sound, or the like. However, the information processing device 30 is only required to be capable of executing predetermined processing based on the determination result made by the condition monitoring device 10. More specifically, the information processing device 30 may be, for example, a server device or the like which can output (inform) the determination result made by the condition monitoring device 10 to a provider of various services. Furthermore, the information processing device 30 may be a control device or the like which can output control commands to the above described production line, etc., or may be a controller server or the like which can output control commands to a network device such as a router.

In the present embodiment, it is assumed that the condition monitoring device 10 is realized as an edge device (terminal) for the Internet of Things (IoT) having less calculation resources compared with the above described information processing device 30 or other server devices, etc.

The condition monitoring device 10 shown in FIG. 1 includes a time-series-signal acquiring module 11, an operation-timing-information acquiring module 12, a first-operation-segment detecting module 13, a second-operation-segment detecting module 14, a condition determining module 15, and a model storage 16.

The time-series-signal acquiring module 11 is a functional module which acquires the signals about the condition of the monitor target 20 (signals caused by operation of the monitor target 20). The above described sensors attached to the monitor target 20 are continuously driven, and the time-series-signal acquiring module 11 acquires time-series signals from the sensors.

The operation-timing-information acquiring module 12 acquires operation timing information, which indicates start of operation of the monitor target 20.

Based on the operation timing information acquired by the operation-timing-information acquiring module 12, the first-operation-segment detecting module 13 detects a first operation segment signal from the time-series signal acquired by the time-series-signal acquiring module 11.

Based on the waveform feature of the first operation segment signal detected by the first-operation-segment detecting module 13, the second-operation-segment detecting module 14 detects a second operation segment signal from the first operation segment signal.

Based on the second operation segment signal detected by the second-operation-segment detecting module 14, the condition determining module 15 determines the condition of the monitor target 20. The determination results made by the condition determining module 15 include, for example, the state in which the monitor target 20 is normal (hereinafter, simply described as "normal") and the state in which the monitor target 20 is anomalous (hereinafter, simply described as "anomalous"). The determination result made by the condition determining module 15 is output to the above described information processing device 30.

In the model storage 16, a trained model (statistical model) to be used in the determination processing by the above described condition determining module 15 is stored in advance. Details of the trained model stored in the model storage 16 will be described later.

FIG. 2 shows an example of a hardware configuration of the state monitoring device 10 shown in FIG. 1. The state monitoring device 10 is provided with a central processing module (CPU) 101, a non-volatile memory 102, a main memory 103, a communication device 104, etc. The CPU 101, the non-volatile memory 102, the main memory 103, and the communication device 104 are mutually connected, for example, via a bus.

The CPU 101 is a hardware processor for controlling operation of various components in the state monitoring device 10. The CPU 101 may be a single processor or may include a plurality of processors. The CPU 101 executes various programs which are loaded from the non-volatile memory 102 to the main memory 103. These programs include, for example, an operating system (OS), etc.

The non-volatile memory 102 is a storage medium used as an auxiliary storage device. The main memory 103 is a storage medium used as a main storage device. FIG. 2 only shows the non-volatile memory 102 and the main memory 103, but the state monitoring device 10 may be provided with other storage devices such as a Hard Disk Drive (HDD), a Solid State Drive (SSD), etc.

In the present embodiment, part or all of the time-series-signal acquiring module 11, the operation-timing-information acquiring module 12, the first-operation-segment detecting module 13, the second-operation-segment detecting module 14, and the condition determining module 15 shown in FIG. 1 are realized by causing the CPU 101 (in other words, a computer of the state monitoring device 10) to execute a program (hereinafter, described as a state monitoring program), i.e., software. This state monitoring program may be stored and distributed in a computer-readable storage medium or may be downloaded to the state monitoring device 10 through a network. Part or all of these modules 11 to 15 may be realized by hardware such as an Integrated Circuit (IC) or may be realized by a combination of software and hardware.

The communication device 104 is a device configured to execute wire communication or wireless communication with external devices such as the above described (sensors attached to) monitor target 20, the information processing device 30, etc.

Next, with reference to the flow chart of FIG. 3, an example of a processing procedure to monitor the condition of the monitor target 20 in the state monitoring device 10 according to the present embodiment will be described.

Herein, in the present embodiment, it is assumed that, for example, first and second sensors are attached to the monitor target 20 or placed around the monitor target 20.

The first sensor is a sensor for measuring signals about the condition of the monitor target 20. The second sensor is a sensor for measuring signals corresponding to operation timing information indicating start of operation of the monitor target 20. The signals measured by the first and second sensors include arbitrary physical quantities, which can be measured (metered) by the first and second sensors.

Specifically, in a case in which the monitor target 20 is a press machine which presses products with a die on a production line as described above, for example a microphone which measures the sound generated in the pressing can be used as the first sensor. As the second sensor, for example, a ranging sensor which measures the distance from the second sensor to the die by using light, ultrasonic waves, or the like can be used.

The above described first and second sensors are assumed to be continuously driven when the state monitoring device 10 monitors the condition of the monitor target 20.

When the state monitoring device 10 is to monitor the monitor target 20, the time-series-signal acquiring module 11 starts acquiring the time-series signal measured by the continuously-driven first sensor (step S1). The time-series-signal acquiring module 11 continues acquiring the time-series signal while the processing of following step S2 and thereafter is executed. If the first sensor is a microphone as described above, the time-series signal acquired by the time-series-signal acquiring module 11 is a signal including the waveform of the sound continuously measured by the microphone.

Then, the operation-timing-information acquiring module 12 acquires the signal measured by the continuously-driven second sensor. Herein, if the monitor target 20 is a press machine as described above and if the second sensor is a ranging sensor, which measures the distance from the second sensor to the die used in pressing of the press machine, the operation-timing-information acquiring module 12 can detect, for example, the fact that the die has been detached from the second sensor (in other words, the press machine operates, and a product is pressed with the die) based on the signal measured by the second sensor. In this case, the operation-timing-information acquiring module 12 acquires operation timing information, which indicates start of operation of the monitor target 20 (press machine). The operation timing information is acquired, for example, when the distance from the second sensor to the die is equal to or more than a predetermined value.

By virtue of this, the operation-timing-information acquiring module 12 monitors the signal measured by the second sensor, thereby determining whether it is the timing that operation of the monitor target 20 starts (in other words, the operation timing information has been acquired) or not (step S2).

If it is determined that it is not the timing that the operation of the monitor target 20 starts (NO in step S2), the processing of step S2 is repeated.

On the other hand, if it is determined that it is the timing that the operation of the monitor target 20 starts (YES in step S2), the first-operation-segment detecting module 13 retains the time-series signal, which has been acquired by the time-series-signal acquiring module 11, in the first-operation-segment detecting module 13 (step S3).

Then, after it is determined in step S2 that it is the timing that the operation of the monitor target 20 starts, the first-operation-segment detecting module 13 determines whether predetermined time (time determined in advance) has elapsed or not (step S4).

If it is determined that the predetermined time has not elapsed (NO in step S4), the process returns to step S3, and the processing is repeated.

On the other hand, if it is determined that the predetermined time has elapsed (YES in step S4), the first-operation-segment detecting module 13 detects the time-series signal, which is retained in the first-operation-segment detecting module 13 in step S3, as a first operation segment signal (step S5).

More specifically, in the present embodiment, the time-series signal which is included in the time-series signal continuously acquired by the time-series-signal acquiring module 11 and is in the segment, which starts after acquisition of the operation timing information and ends when the predetermined time elapses, is detected (acquired) as the first operation segment signal. The predetermined time corresponds to, for example, the time obtained by adding certain time to the operation time of the monitor target 20, which has been measured in advance, as a margin.

Herein, since the above described first and second sensors are driven independently from each other, the operation timing information is non-synchronous with the time-series signal. Therefore, with the provision of a buffer, the first operation segment signal may be the time-series signal which is from the timing a little before the timing at which the operation timing information is acquired to elapse of the predetermined time. Also, with the provision of a delay, the first operation segment signal may be the time-series signal which is from the timing a little after the timing at which the operation timing information is acquired to elapse of the predetermined time.

After the processing of step S5 is executed, the second-operation-segment detecting module 14 detects the second operation segment signal from the first operation segment signal based on the waveform feature of the first operation segment signal detected in step S5 (step S6). In step S6, for example, the rising or decaying timing of (the waveform of) the first operation segment signal at which a predetermined threshold value is crossed is used as an origin, and the time-series signal in the segment from the origin to elapse of predetermined time (time determined in advance) is detected as the second operation segment signal. The predetermined time for detecting the second operation segment signal is the time shorter than the above described predetermined time for detecting the first operation segment signal.

Herein, generally, the temporal resolution of the sampling of the operation timing information (the second sensor) is lower than the temporal resolution of the sampling of the time-series signal (the first sensor). Therefore, in above described step S5, the first operation segment signal (rough operation segment signal) is detected at comparatively rough temporal resolution of sampling based on the operation timing information; and, in step S6, the second operation segment signal (detailed operation segment signal) is detected at finer temporal resolution of sampling than that of the first operation segment signal.

Then, based on the second operation segment signal detected in step S6 and the trained model stored in the model storage 16, the condition determining module 15 determines the condition of the monitor target 20 (step S7).

Hereinafter, the processing of step S7 will be described in detail. First, the trained model (hereinafter, described as a first trained model) stored in the model storage 16 in the present embodiment is, for example, a mathematical model or a physics model, more specifically, a neural network.

In the present embodiment, the first trained model is generated, for example, by learning using the second operation segment signal of the case in which the monitor target 20 is in a normal state (the state of the monitor target 20 is good). Note that "the case in which the monitor target 20 is in a normal state" refers to, for example, the point when the monitor target 20 starts working (the point when the monitor target 20 works for the first time after delivery) or the point immediately after the monitor target 20 undergoes maintenance.

The second operation segment signal for learning of the first trained model may be acquired in the above described state monitoring device 10 (the second-operation-segment detecting module 14) or may be prepared outside the state monitoring device 10. Since the processing amount for learning of the first trained model is large, the first trained model may be generated by an external server device or the like instead of the state monitoring device 10 (edge device).

Herein, the first trained model in the present embodiment learns so that an input layer and an output layer are the same and, for example, functions as an autoencoder. According to the first trained model like this, for example, with respect to an input signal (input data) input to the first trained model, an output signal (output data) reconstructing the input signal is output.

More specifically, if the condition of the monitor target 20 is "normal" in a case in which the first trained model is used, the first trained model outputs an output signal which is the same as or similar to the input signal (the second operation segment signal). On the other hand, if the condition of the monitor target 20 is "anomalous", the first trained model outputs an output signal which is not similar to the input signal (the second operation segment signal).

Therefore, the condition determining module 15 inputs the second operation segment signal (time-series signal) detected in step S6 to the trained model as an input signal and obtains an output signal output from the first trained model. Specifically, for example, if $Xt1, Xt2, \ldots, Xtn$ are input to the first trained model as the second operation segment signal (input signal), $Yt1, Yt2, \ldots, Ytn$ are output from the first trained model as an output signal. Note that $Xti$ ($i=1, 2, \ldots, n$) is a signal value at time $ti$ included in the second operation segment signal. On the other hand, $Yti$ ($i=1, 2, \ldots, n$) is a signal value (output signal) which is output when $Xti$ is input to the first trained model. In this case, $n$ is an integer of 1 or higher.

Then, the condition determining module 15 calculates the anomaly score of the monitor target 20 based on the error between the signal input to the first trained model and the output signal output from the first trained model. As the anomaly score, for example, the mean square error (MSE) of the input signal and the output signal can be used. The value of the anomaly score calculated in this manner becomes larger as the condition of the current monitor target 20 changes (worsens) compared with that at the point when the first trained model is generated (in other words, the point at which the second operation segment signal learned by the first trained model is detected).

If the above described anomaly score is less than a value determined in advance (anomaly threshold value), the condition determining module 15 determines that the condition of the monitor target 20 is "normal". On the other hand, if the anomaly score is equal to or higher than the value determined in advance (anomaly threshold value), the condition determining module 15 determines that the condition of the monitor target 20 is "anomalous".

In the present embodiment, as described above, the condition of the monitor target 20 can be determined by using the first trained model, which functions as an autoencoder.

The case in which the first trained model is used has been described herein. However, for example, a recurrent neural network having a Long Short-Term Memory (LSTM) structure may be used as the trained model (hereinafter, described as a second trained model). In this case, the second trained model (LSTM) is built as a prediction model.

As well as the above described first trained model, the second trained model is generated by learning using the second operation segment signal of the case in which the monitor target 20 is in a normal state. The second trained model learns so that, for example, when the second operation segment signal (input signal) is input to the second trained model, a predicted signal value is output from the second trained model as an output signal.

More specifically, for example, Xti (Xt1, Xt2, ..., Xtn) is input to the above described second trained model (prediction model) as an input signal. If the condition of the monitor target 20 is "normal", a predicted signal value which is the same as or similar to Xti+1 (in other words, the next signal value of Xti) is output from the second trained model as an output signal (in other words, the output signal is similar to the predicted value). On the other hand, if the condition of the monitor target 20 is "anomalous", a predicted signal value which is not similar to Xti+1 is output from the second trained model as an output signal (in other words, the output signal is not similar to the predicted value).

As described above, for example, if Xti is input to the second trained model, the condition determining module 15 calculates the error (predictive error) between above described Xti+1 and the predicted signal value, which is output from the second trained model, as an anomaly score. The condition determining module 15 can determine the condition of the monitor target 20 based on the calculated anomaly score. As the anomaly score, the above described mean square error (MSE) can be used. The value of the anomaly score calculated in this manner becomes larger as the condition of the current monitor target 20 changes (worsens) compared with that at the point when the second trained model is generated (in other words, the point at which the second operation segment signal learned by the second trained model is detected).

The description herein has been given on the assumption that the second operation segment signal detected in step S6 is input to the trained model (the first or second trained model). However, the input signal of the trained model may be a signal obtained by subjecting the second operation segment signal to preprocessing. Specifically, a signal obtained by executing normalization processing using a mean of 0 and a dispersion of 1 with respect to the second operation segment signal detected in step S6 may be the signal input to the trained model. Other than the normalization processing, for example, processing to remove the values which are out of a predetermined range or processing such as frequency conversion may be executed.

The determination result in above described step S7 is output from the state monitoring device 10 (the condition determining module 15) to, for example, the external information processing device 30. The determination result output from the state monitoring device 10 to the information processing device 30 may be, for example, only the condition ("normal" or "anomalous") of the monitor target or may include the above described anomaly score (continuous values indicating the degree of anomaly) etc.

Figure 4:
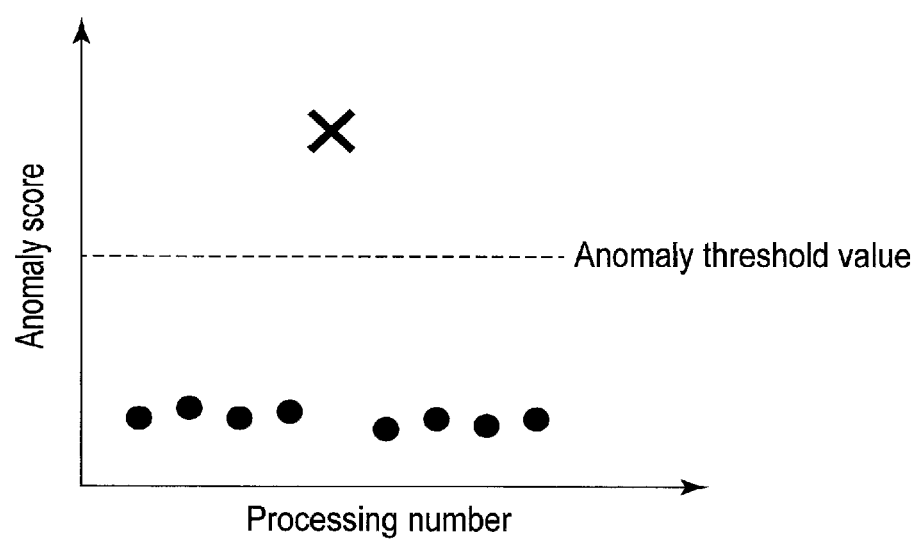
FIG. 4 is a diagram showing an example of determination results shown by a display.

The determination result output from the state monitoring device 10 to the external information processing device 30 can be, for example, displayed by the information processing device 30 (for example, a display or the like). FIG. 4 shows an example of determination results shown by the information processing device 30. In FIG. 4, the monitor target 20 is, for example, a press machine, and FIG. 4 shows the example showing the determination results of the condition of the monitor target 20, which are made every time the press machine operates (presses a product with a die). Specifically, FIG. 4 shows processing numbers given to products and anomaly scores, which were calculated when the products were pressed with the die, in a manner that they are associated with each other. By checking the determination results as shown in FIG. 4, an administrator can easily understand the fact that the monitor target 20 operates in a manner that is determined "anomalous" when the product to which the predetermined processing number is given is pressed with the die.

As described above in the present embodiment, the time-series signal about the condition of the monitor target 20 is acquired from the first sensor (for example, a microphone), and the operation timing information indicating start of operation of the monitor target 20 is acquired. Also, the first operation segment signal is detected from the time-series signal based on the operation timing information, and the second operation segment signal is detected from the first operation segment signal based on the waveform feature of the first operation segment signal. Furthermore, the condition of the monitor target 20 is determined based on the second operation segment signal.

Specifically, the operation timing information is acquired by using the second sensor (for example, a ranging sensor), which has a lower temporal resolution than the sampling of the first sensor. The time-series signal included in the time-series signal acquired by the first sensor and in the segment that starts at least after acquisition of the operation timing information and ends when the time determined in advance elapses is detected as the first operation segment signal.

In the present embodiment, the condition of the monitor target 20 can be determined in real time by virtue of such a configuration.

Herein, for example as shown in FIG. 5, a configuration (hereinafter, described as a comparative example of the present embodiment) in which a monitor target 20 is always monitored by using a time-series signal measured by a first sensor is given as an assumption. In the example shown in FIG. 5, the condition of the monitor target 20 is determined based on the time-series signal in each of the segments of time t11 to t19.

Generally, products in a production line continuously flow at a time interval of, for example, about several seconds, but the time interval is not constant in many cases. Also, end of a lot, detection of a defective product, and so on may temporarily stop the flow of the production line.

For example, if the operation time interval of the monitor target 20 is temporarily shortened like the time t14 to t16 shown in FIG. 5, (the waveform of) the time-series signal caused by a single operation of the monitor target 20 is separated into the segment of the time t14 to t15 and the segment of the time t15 to t16. Therefore, it is difficult to determine the correct condition in the above described comparative example. Moreover, according to the comparative example, unnecessary processing (determination processing of the condition) may be executed, for example, in the segment in which the monitor target 20 is not operating like the time t16 to t17 shown in FIG. 5.

On the other hand, in the state monitoring device 10 according to the present embodiment, as shown in FIG. 6, the time-series signal (the second operation segment signal) in each of the segments, which respectively starts from the time t1 to t7 and ends when the predetermined time elapses, is detected to determine the condition of the monitor target 20. According to this, compared with the above described comparative example (the configuration in which the time-series signal is always monitored), the time to execute determination processing of the condition can be ensured, for example, until the next operation timing signal is detected after the second operation segment signal is detected. Therefore, real-time performance of determination (monitoring) of the condition of the monitor target 20 can be improved (maintained), for example, even if a delay occurs in the determination processing. Moreover, in the present embodiment, the electric power consumption in the state monitoring device 10 can be reduced by reducing the processing amount compared with the comparative example. Furthermore, in the present embodiment, missed monitoring of the condition of the monitor target 20 can be avoided by reliably understanding the start of operation of the monitor target 20 by using the operation timing information.

In the above described comparative example, variations in the temporal direction occur in the time-series signal in the segments for determining the condition of the monitor target 20. However, in the present embodiment, the variations can be reduced, and the precision of condition determination (in other words, anomaly determination) can be improved as a result.

In the comparative example, in order to suppress the influence caused by the above described variations in the temporal direction, for example, in some cases, the time-series signal is converted to and used as an amplitude spectrum or a power spectrum without using the phase information of the time-series signal.

However, in the present embodiment, such phase information can be included, and the determination precision of the condition can be therefore further improved.

In the present embodiment, the condition of the monitor target 20 is determined by using the trained model generated by learning second operation segment signals, which are detected when the monitor target 20 is in a normal state. The present embodiment uses the first trained model, which outputs the output signal which is the same as or similar to the second operation segment signal (input signal), for example, if the monitor target is in a normal state. According to this, if the anomaly score calculated based on the error between the second operation segment signal input to the first trained model and the output signal output from the first trained model is equal to or higher than the value determined in advance, it can be determined that the condition of the monitor target is anomalous.

The case in which the first trained model is used has been described herein. However, the above described second trained model may be used as the trained model, or another trained model may be used.

It has been described that, in the present embodiment, the first operation segment signal is detected from the time-series signal continuously acquired by the time-series-signal acquiring module 11 based on the operation timing information. However, for example, the first sensor may be configured to be driven at the timing when the operation timing information is acquired to acquire the first operation segment signal from the first sensor. In such a configuration, the first sensor stops driving when the first operation segment signal is acquired (in other words, when predetermined time elapses after the operation timing information is acquired). According to this, since the first sensor is not required to be driven all the time, the electric power consumption for monitoring the condition of the monitor target 20 can be reduced.

The determination results of the condition of the monitor target 20 in the present embodiment include "normal" and "anomalous". The trained model may be configured to further learn the second operation segment signal detected by the second-operation-segment detecting module 14 if the determination result is "normal". In a case in which the trained model is generated by an external server device (in other words, learning processing is executed by the external server device), the state monitoring device 10 transmits the second operation segment signal, which is detected by the second-operation-segment detecting module 14, to the server device. The trained model learns the second operation segment signal transmitted from the state monitoring device 10, in the server device. The trained model, which has learned the second operation segment signal in this manner, is transmitted from the server device to the state monitoring device 10. According to this, the trained model stored in the model storage 16 can be updated to the trained model which has further learned in the external server device (in other words, the trained model which has further leaned the second operation segment signal detected by the second-operation-segment detecting module 14 when the determination result was "normal").

The above described determination results of the condition of the monitor target 20 may be configured to be accumulated to carry out learning (batch learning) based on the determination results at the timing determined in advance.

Meanwhile, in the present embodiment, it has been described that, the time-series signal which is included in the detected first operation segment signal and is in the segment, which originates from the rise or decay crossing the value determined in advance and ends when the time determined in advance elapses from the origin, is detected as the second operation segment signal. However, other processing may be executed as the processing to detect the second operation segment signal.

Specifically, in detection of the second operation segment signal, for example, a template about a time-series signal to be detected as the second operation segment signal may be prepared in advance, and the second operation segment signal may be detected based on the template.

Hereinafter, the above described configuration to detect the second operation segment signal by using the template (hereinafter, described as a first modification example of the present embodiment) will be described.

Figure 7:
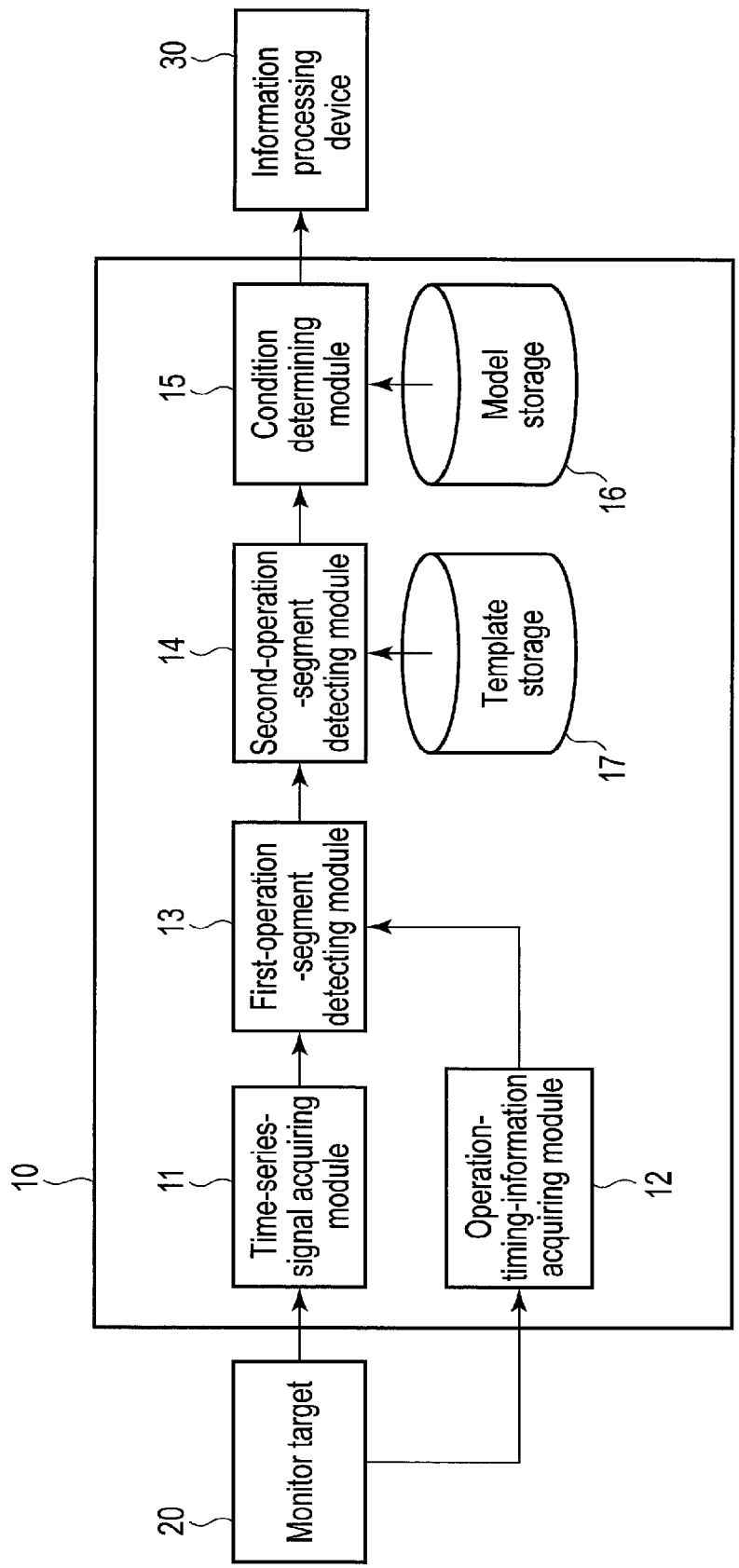
FIG. 7 is a block diagram showing an example of a functional configuration of a condition monitoring device according to a first modification example.

FIG. 7 is a block diagram showing an example of the functional configuration of a state monitoring device 10 according to the first modification example of the present embodiment. The parts similar to those of the state monitoring device 10 according to the present embodiment shown in FIG. 1 are denoted by the same reference numerals, and detailed descriptions thereof are omitted. Herein, the parts different from FIG. 1 will be mainly described.

As shown in FIG. 7, the state monitoring device 10 according to the first modification example of the present embodiment includes a template storage 17.

The template storage 17 stores a template defining a waveform (hereinafter, described as a template waveform), which corresponds to the time-series signal to be detected as a second operation segment signal, and a time length (hereinafter, described as a template time length) of the time-series signal to be detected as the second operation segment signal.

In the first modification example of the present embodiment, in a first operation segment signal detected by a first-operation-segment detecting module 13, a time-series signal in the segment specified based on the similarity to the above described template is detected as the second operation segment signal.

Next, with reference to the flow chart of FIG. 8, an example of the processing procedure to detect the second operation segment signal in the state monitoring device 10 according to the first modification example of the present embodiment will be described. The processing other than the processing to detect the second operation segment signal (in other words, the processing other than step S6 shown in FIG. 3) is similar to the processing of the state monitoring device 10 according to the above described present embodiment. Therefore, herein, detailed description thereof will be omitted. In other words, the processing shown in FIG. 3 is executed also in the state monitoring device 10 according to the first modification example of the present embodiment. However, in this case, the processing shown in FIG. 7 is executed instead of the processing of step S6 shown in FIG. 3.

First, a second-operation-segment detecting module 14 acquires the template stored in the template storage 17 (step S11).

Then, based on the template acquired in step S11, the second-operation-segment detecting module 14 separates a time-series signal in the segment having the template time length from a predetermined originating position of the first operation segment signal detected in step S5 shown in FIG. 3 (step S12). The originating position of the first operation segment signal is, for example, the head of the first operation segment signal (time-series signal).

After the processing of step S12 is executed, the second-operation-segment detecting module 14 calculates the similarity between the time-series signal separated in step S12 and the template waveform (step 313). In step S13, for example, a cross-correlation coefficient is calculated as the similarity.

Figure 8:
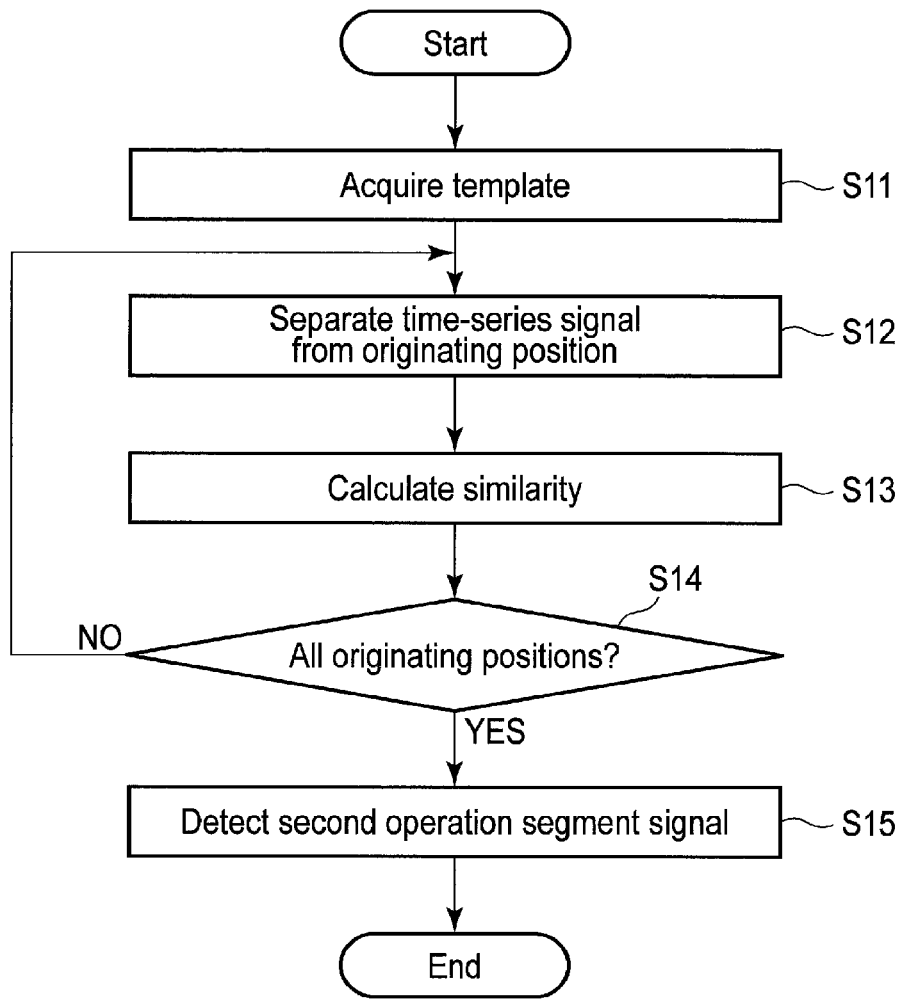
FIG. 8 is a flow chart showing an example of a processing procedure to detect a second operation segment signal in the condition monitoring device according to the first modification example.

In the processing shown in FIG. 8, the above described originating position is sequentially changed at every unit time determined in advance (at the precision of a sampling cycle unit) to repeat the above described processing of steps S12 and S13.

Then, whether the processing of steps S12 and S13 has been executed for all of the originating positions or not is determined (step S14).

If it is determined that the processing has not been executed for all of the originating positions (NO in step S14), the process returns to step 312, and the processing is repeated.

On the other hand, if it is determined that the processing has been executed for all of the originating positions (YES in step S14), the second-operation-segment detecting module 14 detects the time-series signal, which has the highest similarity to the template waveform calculated in above described step 313, as a second operation segment signal (step 315). In other words, in step 315, the time-series signal, which is from the originating position of the case in which the highest similarity is calculated to elapse of the predetermined time (template time length), is detected as the second operation segment signal.

In other words, according to the processing shown in FIG. 8, the processing of extracting the time-series signal from the first operation segment signal at the time shifted each time and calculating the similarity between the extracted time-series signal and the template is sequentially executed. As a result, the time-series signal having the highest calculated similarity can be detected as the second operation segment signal.

Figure 9:
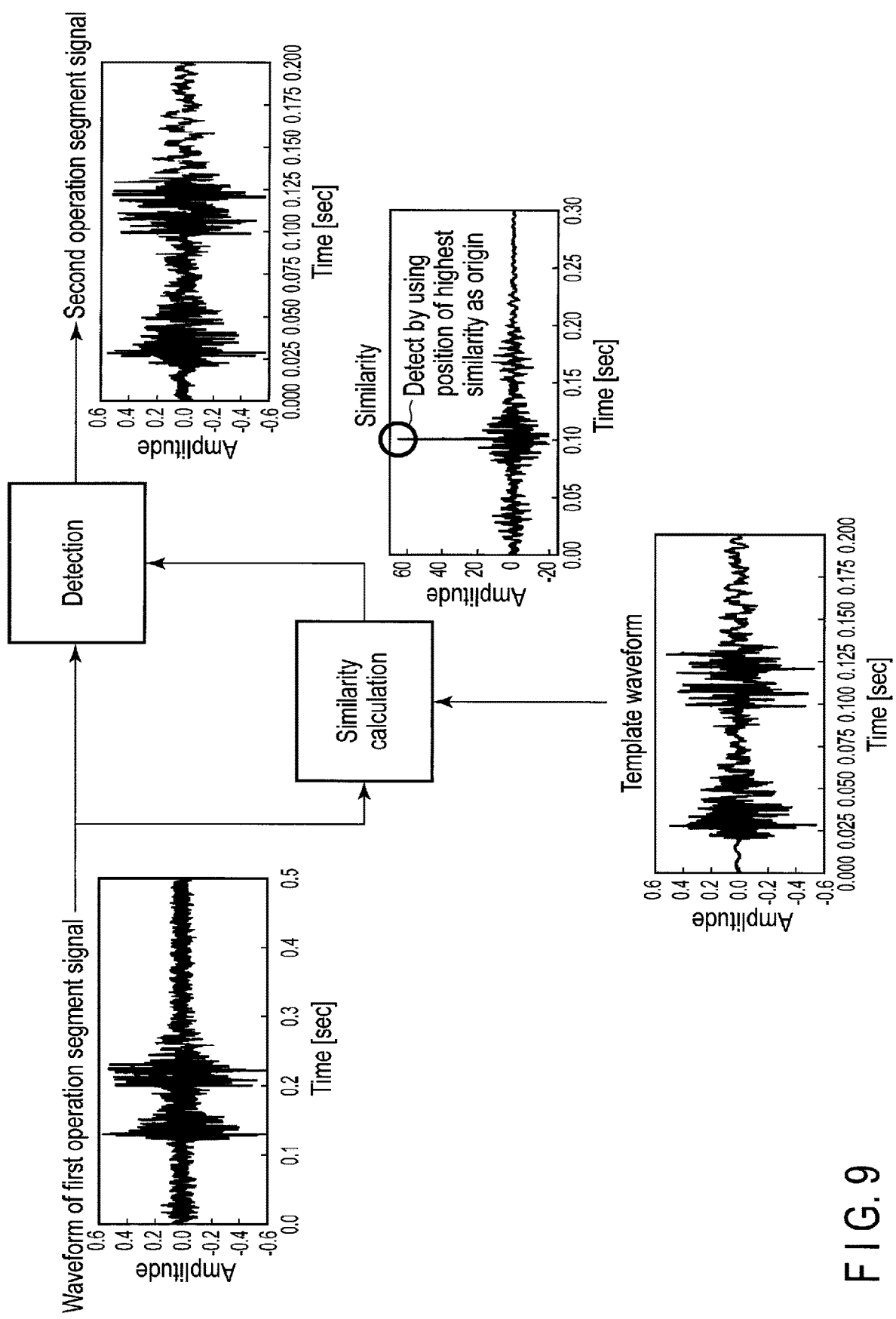
FIG. 9 is a diagram conceptually showing the processing to detect the second operation segment signal by using a template.

FIG. 9 is a diagram conceptually showing the processing shown in FIG. 8. The example shown in FIG. 9 shows the fact that the similarity to the template waveform becomes the highest when the time-series signal is separated from the originating position located at 0.1 sec if the head of the first operation segment signal is 0 sec. In this case, the second operation segment signal is detected at the originating position which is the position of 0.1 sec of the first operation segment signal at which the similarity is the highest.

In the case in which the second operation segment signal is detected by using the template in the above described manner, the second operation segment signal similar to the time-series signal to be detected (template) can be detected compared with the configuration as described in FIG. 3 in which the second operation segment signal is detected simply based on the rise or decay of the first operation segment signal. In other words, in the first modification example of the present embodiment, the second operation segment signal which is appropriate can be detected, and the determination precision of the condition of the monitor target 20 using the second operation segment signal can be improved.

In the above described production line, pressing or the like may be carried out for a plurality of types of products (in other words, objects of operation of the monitor target 20). In such a case, the state monitoring device 10 acquires different time-series signals depending on the types of the products. Therefore, in the case of the configuration in which the second operation segment signal is detected by using the template in the above described manner, it is preferred to switch the template for each type of products. However, it is cumbersome to switch the template, for example, by human hands.

Therefore, it is possible to employ a configuration of, for example, preparing in advance a plurality of templates corresponding to the types of products and automatically selecting the template appropriate for the products flowing in a production line to detect a second operation segment signal (hereinafter, described as a second modification example of the present embodiment).

Hereinafter, the second modification example of the present embodiment will be described. The functional configuration of a state monitoring device 10 according to the second modification example of the present embodiment is the same as that of FIG. 7 except that a template storage 17 of the first modification example of the present embodiment stores in advance a plurality of templates corresponding to types of products.

Figure 10:
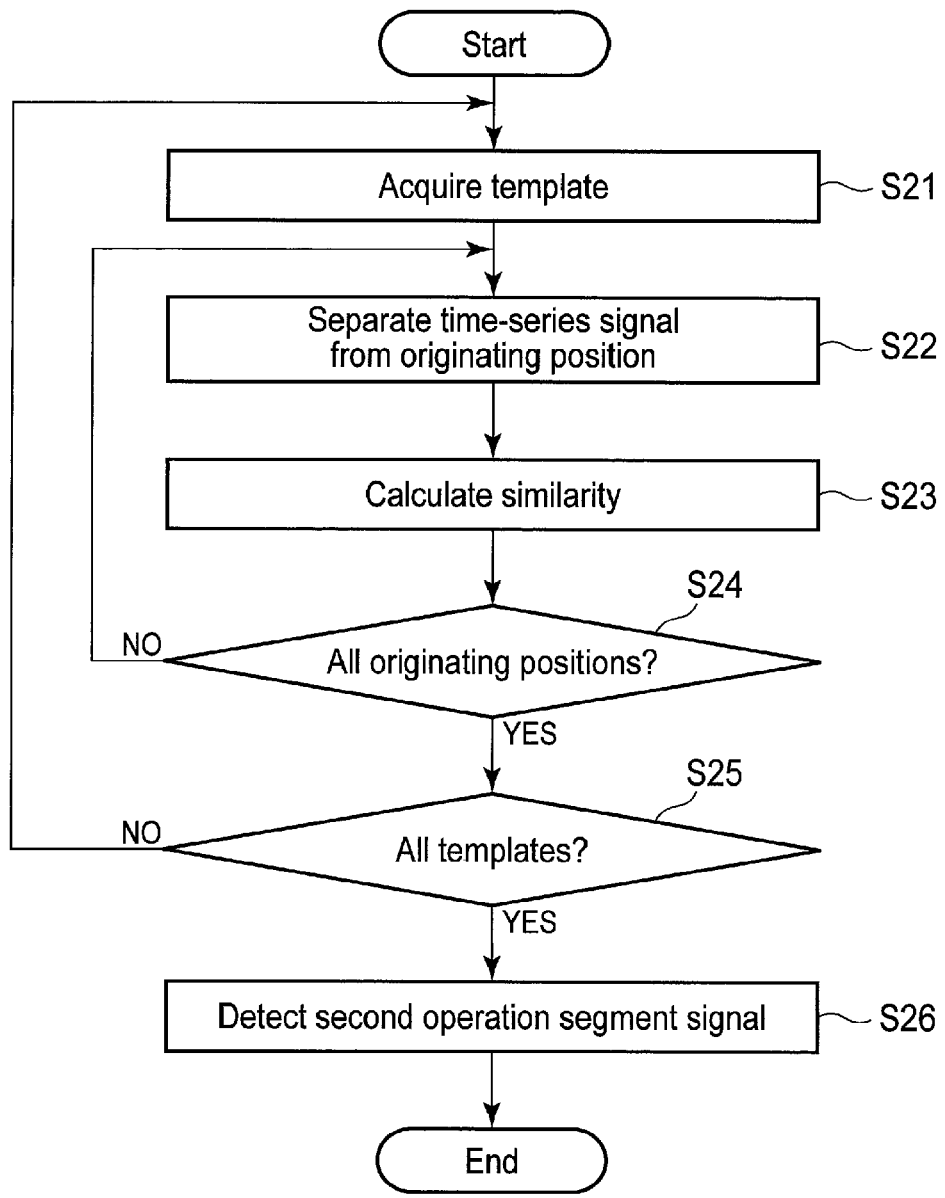
FIG. 10 is a flow chart showing an example of a processing procedure to detect a second operation segment signal in a condition monitoring device according to a second modification example.

With reference to the flow chart of FIG. 10, an example of the processing procedure to detect the second operation segment signal in the state monitoring device 10 according to the second modification example of the present embodiment will be described.

First, a second-operation-segment detecting module 14 acquires one template (hereinafter, described as an object template) among a plurality of templates stored in the template storage 17 (step S21). The plurality of templates stored in the template storage 17, for example, have different template waveforms and template time lengths, but are the same in a point that the template waveforms and the template time lengths are defined.

Then, the second-operation-segment detecting module 14 executes the processing of steps S22 to S24, which correspond to the above described processing of steps S12 to 314 shown in FIG. 8, by using the object template. If it is determined in step S24 that the processing has not been executed for all of originating positions (NO in step S24), the process returns to step S22, and the processing is repeated.

On the other hand, if it is determined in step S24 that the processing has been executed for all of the originating positions, the second-operation-segment detecting module 14 determines whether or not the processing of steps S22 to S24 has been executed for all of the templates stored in the template storage 17 (step S25).

If it is determined that the processing has not been executed for all of the templates (NO in step S25), the process returns to step S21, and the processing is repeated. In this case, in step S21, a template for which the processing of steps S22 to S24 has not been executed is acquired as the object template, and the processing of these steps S22 to S24 is executed. In other words, in the second modification example of the present embodiment, the processing of steps S22 to S24 of calculating similarity is executed for all of the plurality of templates corresponding to the types of products.

On the other hand, if it is determined that the processing has been executed for all of the templates (YES in step S25), the second-operation-segment detecting module 14 detects, as the second operation segment signal, the time-series signal having the highest similarity among the similarities calculated in step S23 respectively for the time-series signals separated in step S22 respectively for the plurality of templates (step S26).

As described above, in the second modification example of the present embodiment, the templates (first and second templates) about the time-series signals to be detected as the second operation segment signals are prepared respectively for the objects (first and second objects) of operation of a monitor target 20. Also, in the second modification example of the present embodiment, the time-series signal of the segment specified based on the similarity with each of the templates is detected as the second operation segment signal. In such a configuration, the time-series signal of the segment specified by using the appropriate template (in other words, the template having a high similarity) corresponding to the object of operation of the monitor target 20 (for example, a product to be pressed by a press machine) can be detected as the second operation segment signal. Therefore, the precision of determination of the condition of the monitor target 20 using the second operation segment signal can be improved.

In the second modification example of the present embodiment, the time-series signal (the second operation segment signal) which is different depending on the type of the product is acquired as described above. Therefore, when the condition of the monitor target 20 is to be determined, it is preferred to use the trained model corresponding to the object (the type of the product) of operation of the monitor target 20.

Specifically, for example, if objects of operation of the monitor target 20 include first and second objects, a trained model corresponding to the first object and a trained model corresponding to the second object may be stored in a model storage 16.

In this case, for example, if the detected second operation segment signal is the time-series signal of the segment specified based on the similarity with the template (first template) corresponding to the first object, the condition of the monitor target 20 is determined by using the trained model corresponding to the first object. On the other hand, for example, if the detected second operation segment signal is the time-series signal of the segment specified based on the similarity with the template (second template) corresponding to the second object, the condition of the monitor target 20 is determined by using the trained model corresponding to the second object.

The trained model corresponding to the first object is a trained model generated by learning the second operation segment signal detected when the monitor target 20 is in a normal state and the monitor target 20 operates with respect to the first object. On the other hand, the trained model corresponding to the second object is a trained model generated by learning the second operation segment signal detected when the monitor target is in a normal state and the monitor target operates with respect to the second object.

According to such a configuration, the condition of the monitor target 20 can be determined by using the appropriate trained model corresponding to the object of operation of the monitor target 20. Therefore, the determination precision can be further improved.

In the present embodiment, the first sensor for measuring the signals about the condition of the monitor target 20 has been described as a microphone. However, the first sensor may be a sensor other than a microphone. Examples of the usable first sensor other than a microphone include an acceleration sensor, a vibration sensor, and an Acoustic Emission (AE) sensor. In such a case, for example, the acceleration, vibrations, and AE caused when a press machine carries out pressing can be measured.

Furthermore, depending on the type of the monitor target 20, the first sensor may be, for example, a Doppler sensor or a ranging sensor. If a Doppler sensor is used as the first sensor, the position or movement of a monitor target 20 can be measured by radiating radio waves from the Doppler sensor to the monitor target 20 and detecting reflected waves from the monitor target 20 by the Doppler sensor. If a ranging sensor is used as the first sensor, the distance between the ranging sensor and a monitor target 20 (in other words, the position or movement of the monitor target 20) can be measured by using, for example, light, ultrasonic waves, or the like.

The first sensor described herein is an example, and the first sensor may measure, for example, at least one (signal) of the sound, vibration, light, and radio wave generated when the monitor target 20 operates. As described above, various sensors can be used as the first sensors. However, which sensor to be used as the first sensor can be appropriately selected depending on (the type of) the monitor target 20.

Furthermore, in the present embodiment, the second sensor for measuring the signal corresponding to the operation timing information, which indicates start of operation of the monitor target 20, has been described as a ranging sensor. However, the second sensor may be an acceleration sensor. In such a case, the operation-timing-information acquiring module 12 can acquire the operation timing information about the orientation or movement of the monitor target 20 according to the acceleration measured by the acceleration sensor.

Also, the second sensor may be a Doppler sensor or a ranging sensor. If a Doppler sensor is used as the second sensor, the operation-timing-information acquiring module 12 can acquire the operation timing information about the position or movement of the monitor target 20 measured by the Doppler sensor. If a ranging sensor is used as the second sensor, the operation timing information about the distance between the ranging sensor and the monitor target 20, which is measured by the ranging sensor, can be acquired.

In the present embodiment, it has been described that the second sensor is used to acquire the operation timing information. However, the operation timing information may be information that indicates start of operation of the monitor target 20. Therefore, for example, if operation of the monitor target 20 is controlled based on a predetermined program, a signal for controlling operation of the monitor target 20 may be configured to be acquired as the operation timing information.

In the above described present embodiment, it has been mainly described that the monitor target 20 is a press machine used in a production line of a manufacturing factory. However, the monitor target 20 may be, for example, another device such as a rotating machine. Furthermore, the monitor target 20 may be a device other than the above described device provided at a manufacturing factory, a plant, a construction site, an educational facility, a medical facility, housing equipment, or the like. Examples thereof may be space such as outdoor, indoor, and in-vehicle space, and examples thereof may be living bodies such as a person and an animal.

In the present embodiment, it has been described that the time-series signals (the first and second operation segment signals) are detected at the timing when operation of the monitor target 20 (device) starts to determine the condition of the monitor target 20. However, if the monitor target 20 is space, for example, a time-series signal can be detected at the timing when an environment of the space changes to determine the state, etc., of the environment. If the monitor target 20 is a living body, a time-series signal can be detected at the timing when the living body carries out a predetermined operation to determine the state of the living body.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A condition monitoring device comprising;
    a processor configured to:
        acquire a time-series signal about a condition of a monitor target from a first sensor;
        acquire operation timing information indicating start of operation of the monitor target, the operation timing information being acquired by using a second sensor different from the first sensor;
        detect a first operation segment signal from the time-series signal based on the operation timing information;
        detect a second operation segment signal from the first operation segment signal based on a waveform feature of the first operation segment signal; and
        determine the condition of the monitor target based on the second operation segment signal, wherein
    temporal resolution of sampling of the second sensor is lower than temporal resolution of sampling of the first sensor.

2. The condition monitoring device according to claim 1, wherein
    the processor is configured to detect, as the first operation segment signal, a time-series signal which is included in the acquired time-series signal and is in a segment, which starts at least after acquisition of the operation timing information and ends when time determined in advance elapses.

3. The condition monitoring device according to claim 1, wherein
    the processor is configured to detect, as the second operation segment signal, a time-series signal which is included in the first operation segment signal and is in a segment, which originates from rise or decay crossing a value determined in advance and ends when time determined in advance elapses from an origin.

4. The condition monitoring device according to claim 1, further comprising
    a first storage configured to store a template about a time-series signal to be detected as the second operation segment signal, wherein
    the processor is configured to detect, as the second operation segment signal, a time-series signal which is included in the first operation segment signal and is in a segment specified based on a similarity with the template.

5. The condition monitoring device according to claim 4, wherein
    the processor is configured to:
        sequentially execute processing of extracting a time-series signal at time shifted each time from the first operation segment signal and calculating a similarity between the extracted time-series signal and the template; and
        detect the time-series signal having the highest calculated similarity as the second operation segment signal.

6. The condition monitoring device according to claim 1, further comprising
    a second storage configured to store a trained model generated by learning the second operation segment signal, which is detected when the monitor target is in a normal condition, wherein
    the processor is configured to determine the condition of the monitor target based on an output signal, which is output from the trained model when the second operation segment signal is input to the trained model as an input signal.

7. The condition monitoring device according to claim 6, wherein
    when the monitor target is in the normal condition, the trained model outputs the output signal which is the same or similar to the second operation segment signal input to the trained model as the input signal; and, when an anomaly score calculated based on an error between the second operation segment signal input to the trained model as the input signal and the output signal output from the trained model is equal to or higher than a value determined in advance, the processor is configured to determine that the condition of the monitor target is anomalous.

8. The condition monitoring device according to claim 6, wherein
when it is determined that the condition of the monitor target is normal, the trained model further learns the second operation segment signal.

9. The condition monitoring device according to claim 1, further comprising
a first storage configured to store a first template about a time-series signal to be detected as the second operation segment signal corresponding to a first object of operation of the monitor target and a second template about a time-series signal to be detected as the second operation segment signal corresponding to a second object of operation of the monitor target, wherein
the processor is configured to detect, as the second operation segment signal, a time-series signal which is included in the first operation segment signal and is in a segment specified based on a similarity with the first template and the second template.

10. The condition monitoring device according to claim 9, wherein
the processor is configured to:
when the second operation segment signal is the time-series signal in the segment specified based on the similarity with the first template, determine the condition of the monitor target based on an output signal output from a trained model as a result of inputting the second operation segment signal as an input signal to the trained model corresponding to the first object,
when the second operation segment signal is the time-series signal in the segment specified based on the similarity with the second template, determine the condition of the monitor target based on an output signal output from a trained model as a result of inputting the second operation segment signal as an input signal to the trained model corresponding to the second object,
the trained model corresponding to the first object is generated by learning the second operation segment signal, which is detected when the monitor target is in a normal condition and the monitor target operates with respect to the first object, and
the trained model corresponding to the second object is generated by learning the second operation segment signal, which is detected when the monitor target is in a normal condition and the monitor target operates with respect to the second object.

11. A method executed by a condition monitoring device, the method comprising:
acquiring a time-series signal about a condition of a monitor target from a first sensor;
acquiring operation timing information indicating start of operation of the monitor target, the operation timing information being acquired by using a second sensor different from the first sensor;
detecting a first operation segment signal from the time-series signal based on the operation timing information;
detecting a second operation segment signal from the first operation segment signal based on a waveform feature of the first operation segment signal; and
determining the condition of the monitor target based on the second operation segment signal, wherein
temporal resolution of sampling of the second sensor is lower than temporal resolution of sampling of the first sensor.

12. A non-transitory computer-readable storage medium having stored thereon a computer program which is executable by a computer, the computer program comprising instructions capable of causing the computer to execute function of:
acquiring a time-series signal about an condition of a monitor target from a first sensor;
acquiring operation timing information indicating start of operation of the monitor target, the operation timing information being acquired by using a second sensor different from the first sensor;
detecting a first operation segment signal from the time-series signal based on the operation timing information;
detecting a second operation segment signal from the first operation segment signal based on a waveform feature of the first operation segment signal; and
determining the condition of the monitor target based on the second operation segment signal, wherein temporal resolution of sampling of the second sensor is lower than temporal resolution of sampling of the first sensor.

\* \* \* \* \*